Patented July 7, 1931

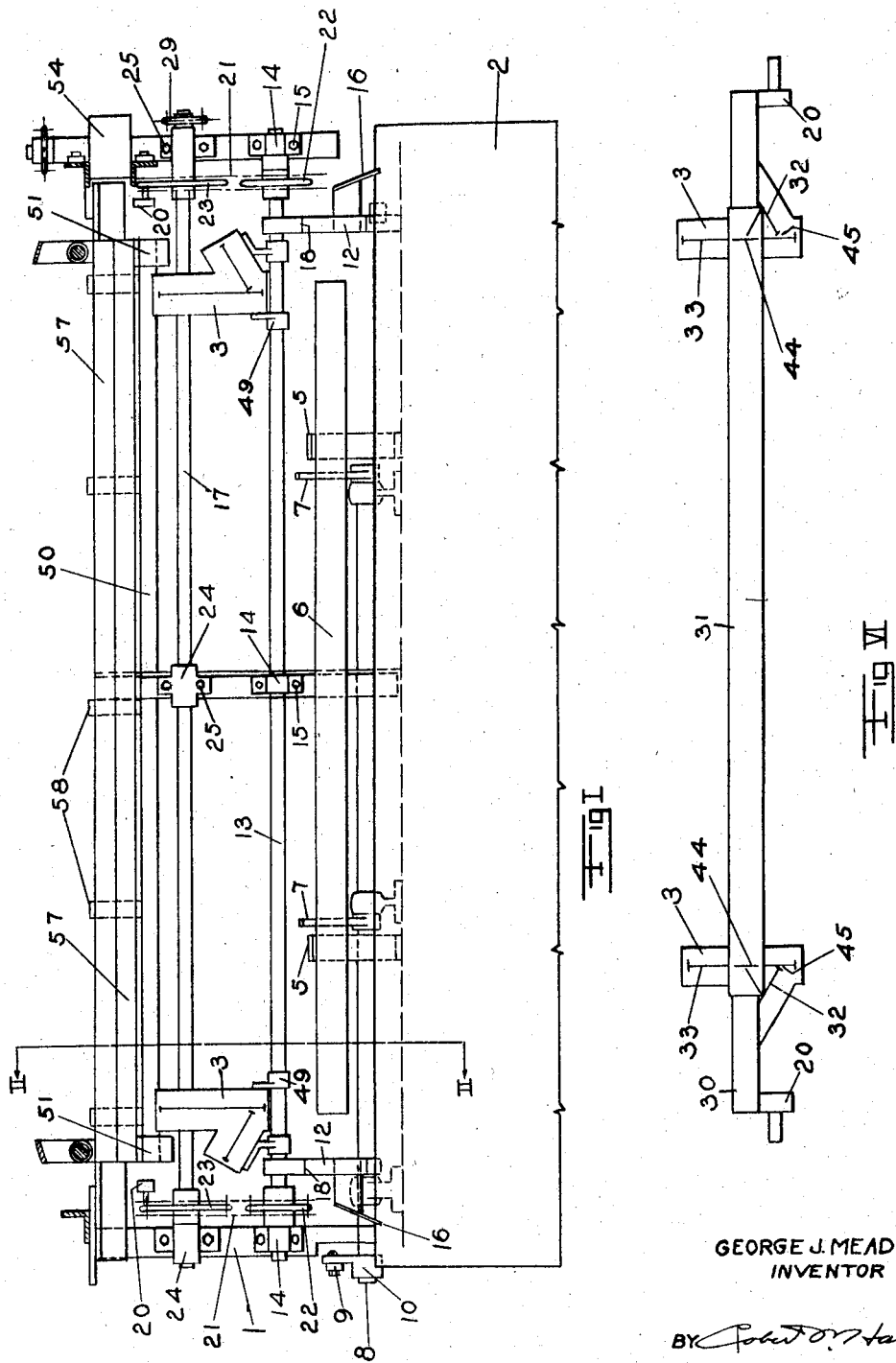

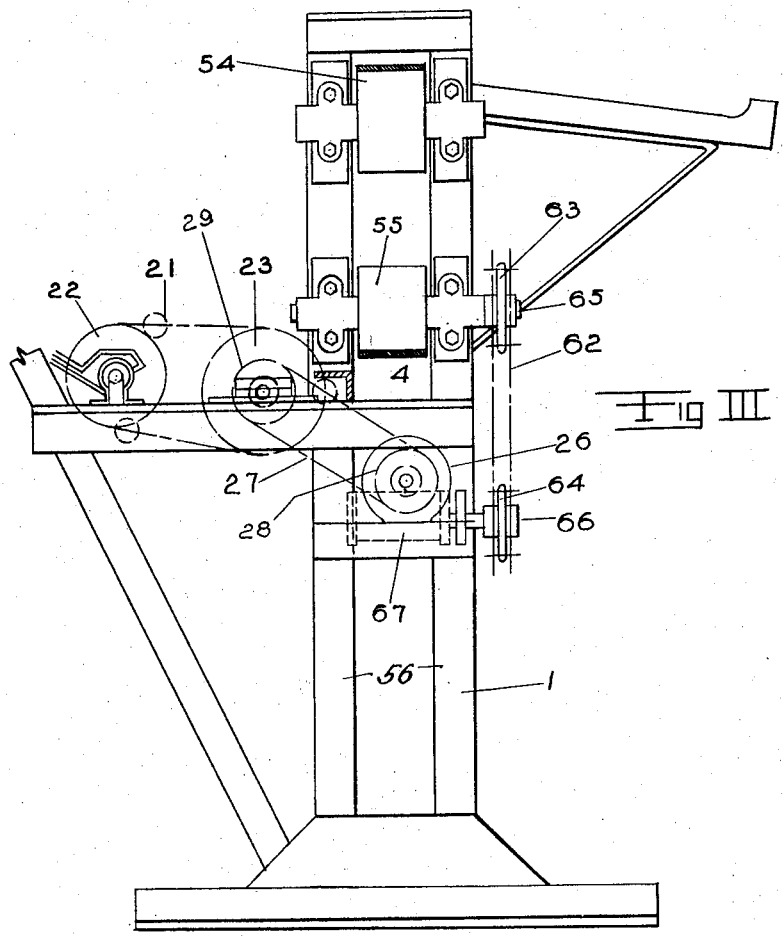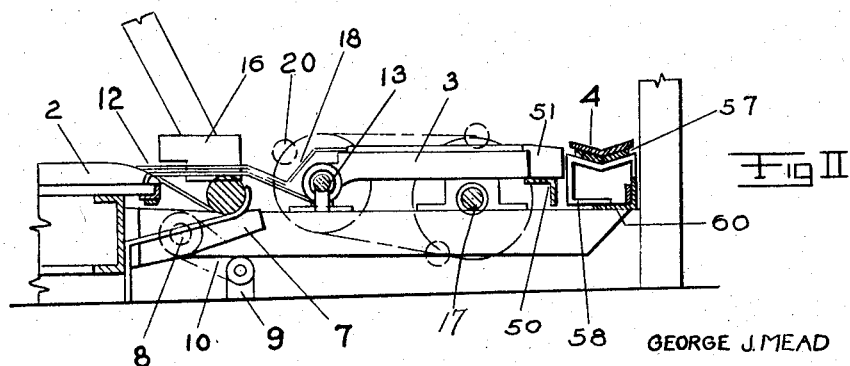

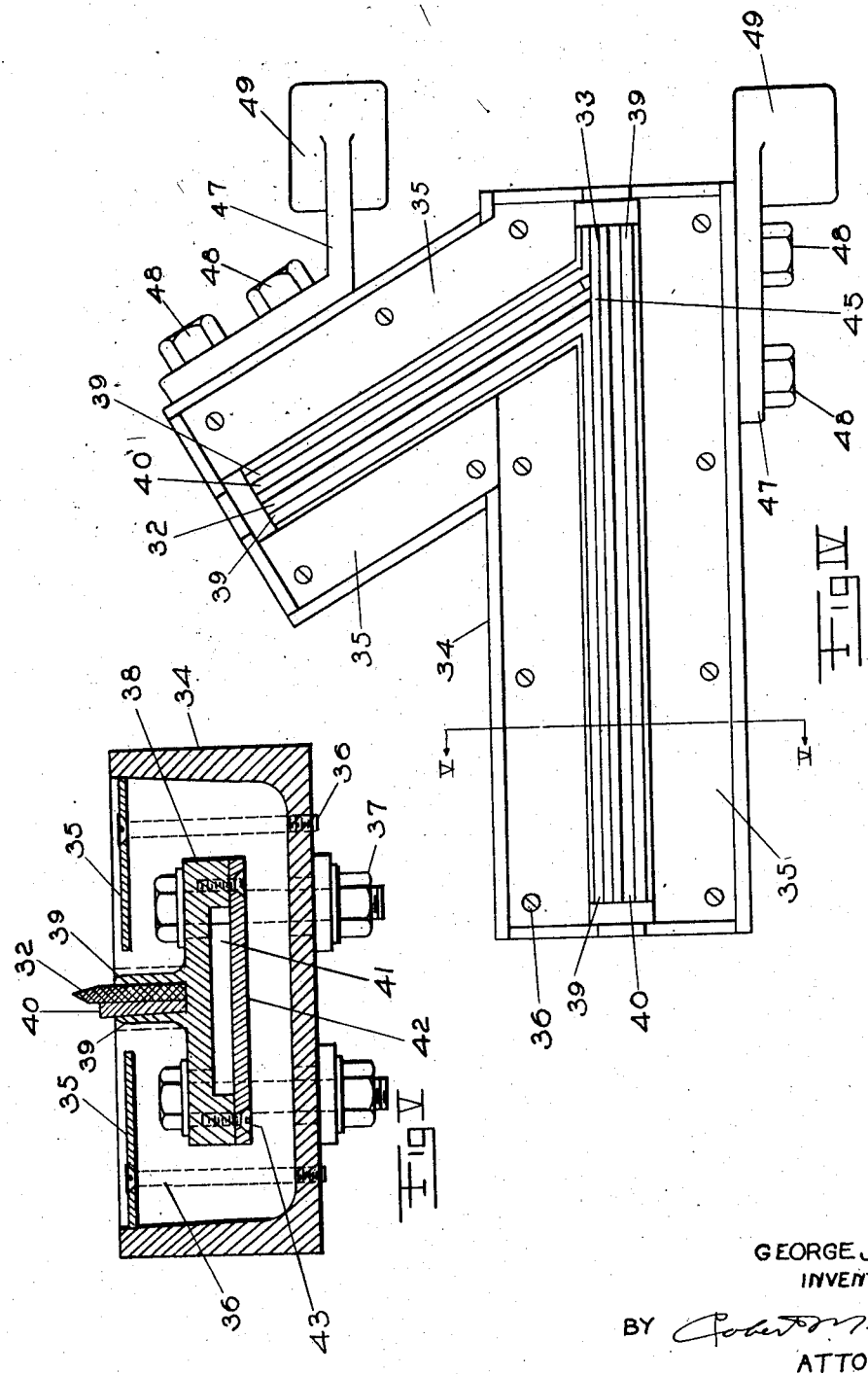

1,813,246

UNITED STATES PATENT OFFICE

GEORGE J. MEAD, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

DEVICE FOR CUTTING RUBBER TUBES

Application filed November 14, 1925. Serial No. 69,125.

My invention relates to the manufacture of rubber tubes, such as so called inner tubes for pneumatic tire casings, and more particularly to a method of cutting such tubing into length and a device for carrying out the method.

It is among the objects of my invention to cut the tube to length while in an unvulcanized condition thereby effecting a saving of the stock cut off. A further object is to provide means for automatically performing the cutting operation while the tube is on the supporting mandrel without the necessity of manipulation by an operator. Other and further objects will appear from the following specification and claims.

In the accompanying drawings which illustrate one form of my invention

Figure 1 is a plan view of a device according to my invention,

Figure 2 is a section taken substantially on line 2—2 of Figure 1,

Figure 3 is an end view of the device shown in Figure 1,

Figure 4 is a plan view of one of the cutting elements on an enlarged scale,

Figure 5 is a section on line 5—5 of Figure 4, and

Figure 6 is a diagrammatic view showing the manner of operation.

Briefly my device comprises a frame 1 supporting a rolling table 2 cutting units 3 and a conveyor 4 to receive the cut tubes. The rolling table which may be of any suitable or conventional form is shown provided at its forward edge with brackets 5 adapted to hold a cylindrical bar 6 below the table surface. The bar 6, which is used to hold one edge of the tube stock while the latter is rolled about the mandrel, is adapted to be thrown onto the table for use by means of fingers 7 secured to rock shaft 8 operated by a foot treadle (not shown) through link 9 and arm 10 secured to the end of shaft 8. The specific form of rolling table 2 and its accessories form no part of my invention and further description thereof is believed unnecessary. From the rolling table the mandrel with the tube formed thereon is pushed by the operator onto guides 12, secured at one end to table 2 and supported at the other by a shaft 13, rotatable in bearings 14 secured by suitable bolts 15 to frame 1. Guides 12 are provided, adjacent the table 2, with upstanding flanges 16 which serve to center the mandrel and tube with respect to the cutting units, and the guides are formed with depressions 18 into which the mandrels roll by gravity from the table. The mandrels are moved from depressions 18 by pushers 20 secured to sprocket chains 21 passing around sprockets 22 and 23 secured respectively to shaft 13 (previously referred to) and shaft 17 rotatably mounted in bearings 24 secured to frame 1 by suitable bolts 25. Chains 21 are driven from a motor 26 by means of a sprocket chain 27 passing around a sprocket 28 secured to the motor shaft and sprocket 29 secured to the end of shaft 17. Pushers 20 engage the ends of the mandrel 30 as shown in Figure 6 and roll the latter, with its tube 31 thereon, over the cutting units 3 which are positioned to trim the tubes to a predetermined length. The cutting units, as best shown in Figures 4 and 5, comprise blades 32 and 33 set at an angle to each other and supported in a housing in the form of an angular shaped channel member 34 provided with cover plates 35 secured in position by machine screws 36. Supported within the housing by bolts 37 is a blade supporting member 38 provided with upstanding lips 39 in which the knife blades 32 and 33 are removably held by wedges 40. The underside of member 38 is channeled at 41 to form a recess to receive an electrical heating unit of any suitable form, the latter being held in place by plate 42 secured by machine screws 43.

As the tube supported on the mandrel comes in contact with the heated blade 33 the end of the tube is severed to leave a predetermined length of tube on the mandrel, as clearly indicated at 44 in Figure 6. Angularly positioned blade 32 severs the annular cut-off portion to permit its easy removal, preferably however, the end of blade 32 is slightly spaced from blade 33 as shown at 45 which leaves a small uncut portion 46 retaining the trimmed portion of the tube on the mandrel until the mandrel and tube have left the machine. The portion 46 is easily broken by the operator when the tube reaches a convenient place for removal and salvaging of the trimmings.

The weight of the mandrel forces the tube against the blades and the heating of the cutting blades facilitates the severing of the raw rubber which tends to soften under the application of heat. The weight of the mandrel and the heating of the blades are variable factors which may be altered to meet varying conditions of operation. Obviously the cutting resistance of a thin gauge tube formed of soft stock is less than the cutting resistance of a thick gauge tube formed of a dense tough stock; further, a given tube on a light mandrel may require the use of a heated cutter when the use of a heavier mandrel for the same tube might permit the use of an unheated cutter. The discretion of the skilled workman will readily adjust the factors of mandrel weight and the presence or absence or degree of heat to meet a specific condition.

The cutting units are conveniently supported on shaft 13 by means of lugs 47, secured to housing 34 of the cutting units by bolts 48, and provided with bearings 49 suitably mounted on said shaft 13. The forward ends of the cutting units, (see Figure 2) are supported by angle bar 50 forming part of frame 1.

As the mandrel leaves the cutting units the mandrel ends are supported by blocks 51 mounted on bar 50, the continued movement of pushers 20 discharging the mandrel with the tube carried thereon, onto a suitable conveyor which transports the assembly to other desired stations for further operations. As shown, this conveyor comprises belt 4 passing over suitable pulleys, two of which are shown at 54 and 55 supported by uprights 56 forming part of frame 1. The mandrels are received on the lower run of the belt which is supported by bars 57 secured to suitable brackets 58 supported by frame member 60. The belt is omitted in Figure 1 to better disclose bars 57. The conveyor belt may be conveniently driven from motor 26 by means of sprocket chain 62 passing over sprockets 63 and 64 mounted respectively on shaft 65 of pulley 55 and shaft 66 of worm 67 driven from motor 26.

I claim:

1. A device for cutting tubes to length while supported on a mandrel which comprises, a relatively stationary cutting element and means to roll the tube and mandrel bodily over said element.

2. A device for cutting tubes to length, while supported on a mandrel, which comprises a relatively stationary cutting element, means to heat said element and means to roll the tube and mandrel over said heated cutting element.

3. A device for cutting tubes to length while supported on a mandrel, which comprises a pair of relatively stationary cutting elements spaced from each other a distance equal to the desired length of tube and means to roll the tube and mandrel bodily over said cutting elements.

4. A device for cutting tubes to length while supported on a mandrel which comprises two parallel blades spaced from each other a distance equal to the desired length of tube, secondary blades extending at an angle outwardly from said first named blades and means to roll the tube and mandrel over said blades.

5. A device for cutting tubes to length, while supported on a mandrel, which comprises relatively stationary heated cutting elements spaced from each other a distance equal to the desired length of tube and means to roll the tube and mandrel transversely over said heated cutting elements.

6. In a tube forming machine a table upon which a sheet of tube stock may be wound upon a mandrel, a conveyor spaced from the table and adapted to receive the assembled tube and mandrel, means to receive the assembly from the table and move it to the conveyor and means in the path of such movement to cut the tube to predetermined length.

7. In a tube forming machine a table upon which a sheet of tube stock may be wound upon a mandrel, a conveyor spaced from the table and adapted to receive the assembled tube and mandrel, means to receive the assembly from the table and move it to the conveyor and spaced cutting elements in the path of such movement to trim the ends of the tube.

8. In a tube forming machine a table upon which a sheet of tube stock may be wound upon a mandrel, a conveyor spaced from the table and adapted to receive the assembled tube and mandrel, means to receive the assembly from the table and move it to the conveyor and a stationary blade in the path of such movement and over which the assembly is moved to trim an end of the tube.

9. In a tube forming machine a table upon which a sheet of tube stock may be wound upon a mandrel, a conveyor spaced from the table and adapted to receive the assembled tube and mandrel, means to receive the assembly from the table and move it to the conveyor and a pair of stationary blades, spaced from each other a distance equal to the desired length of tube, in the path of such movement.

10. A device for trimming the ends of raw rubber tubes which comprises two blades positioned in a substantially V formation, a support therefor and means for heating the blades.

11. A device for trimming the ends of raw rubber tubes which comprises a blade, a second blade positioned intermediate the ends of, and at an angle to, the first named blade and means for heating the blades.

12. A device as in claim 11 the second blade being spaced a small distance from the first blade.

13. The method of cutting rubber tubes while supported on the mandrel which comprises rolling the so supported tube bodily over a relatively stationary cutting element.

14. The method of cutting rubber tubes while supported on a mandrel which comprises rolling the so supported tube over a relatively stationary cutting element, the effective cutting pressure being supplied by the weight of the mandrel.

15. The method of cutting rubber tubes while supported on a mandrel which comprises rolling the so supported tube over a relatively stationary heated cutting element.

16. The method of cutting rubber tubes while supported on a mandrel which comprises rolling the so supported tube over a relatively stationary heated cutting element, the effective cutting pressure being supplied by the weight of the mandrel.

17. A device for cutting tubes to length, while supported on a mandrel, which comprises substantially parallel cutting elements spaced a predetermined distance from each other and adapted as the tube and mandrel are rolled thereon to cut away the end portions of the tube, and means associated with said parallel cutting elements to at least partially sever the cut away end portions of the tube longitudinally to facilitate their removal from the mandrel.

18. A device for cutting tubes to length, while supported on a mandrel, which comprises substantially parallel heated cutting elements spaced a predetermined distance from each other and adapted as the tube and mandrel are rolled thereover to cut away the end portions of the tube, and auxiliary heated cutting means associated with each of said parallel cutting elements to at least partially sever the cut away end portions of the tube longitudinally to facilitate their removal from the mandrel.

In testimony whereof I have signed my name to the above specification.

GEORGE J. MEAD.